Patented June 1, 1926.

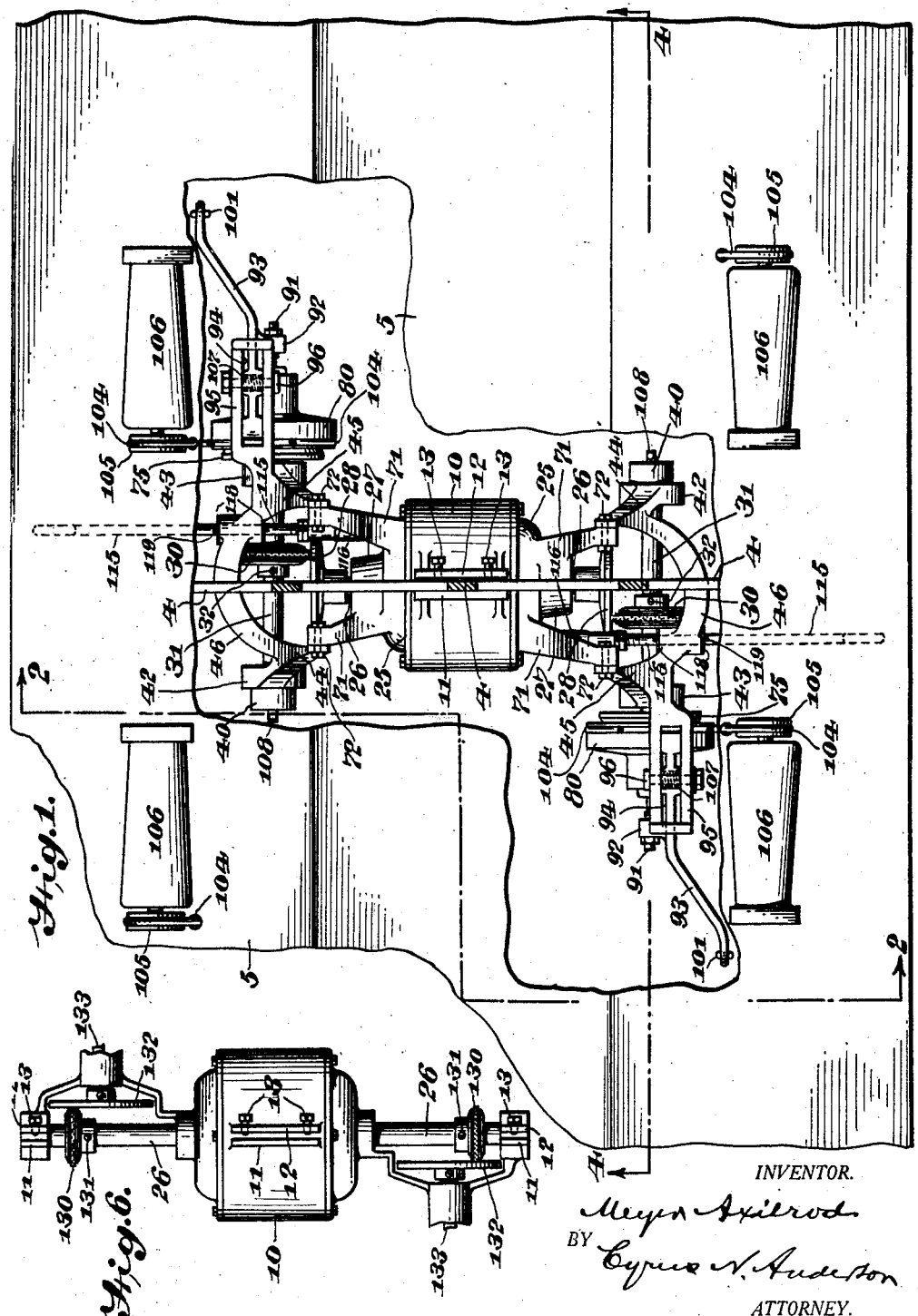

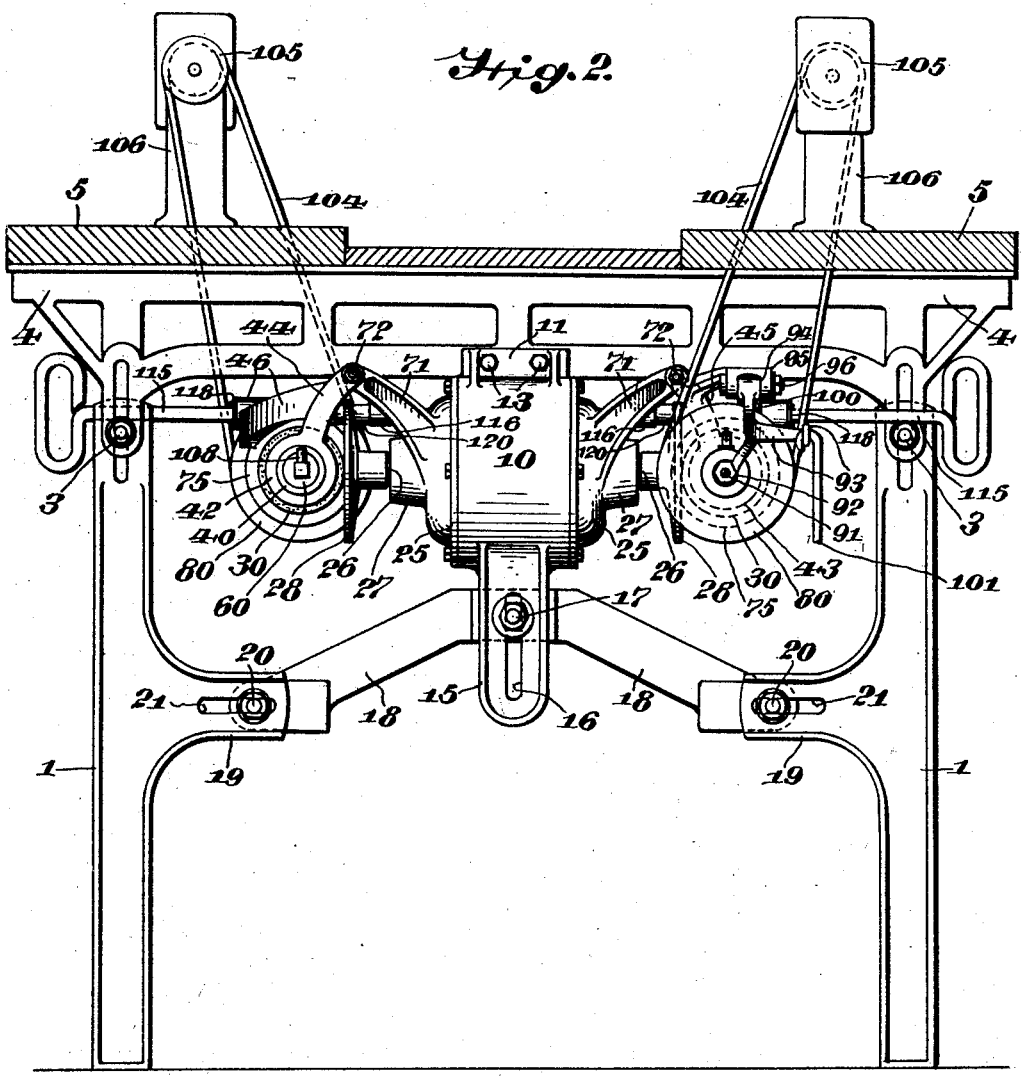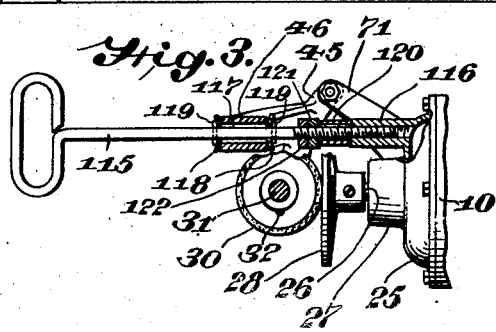

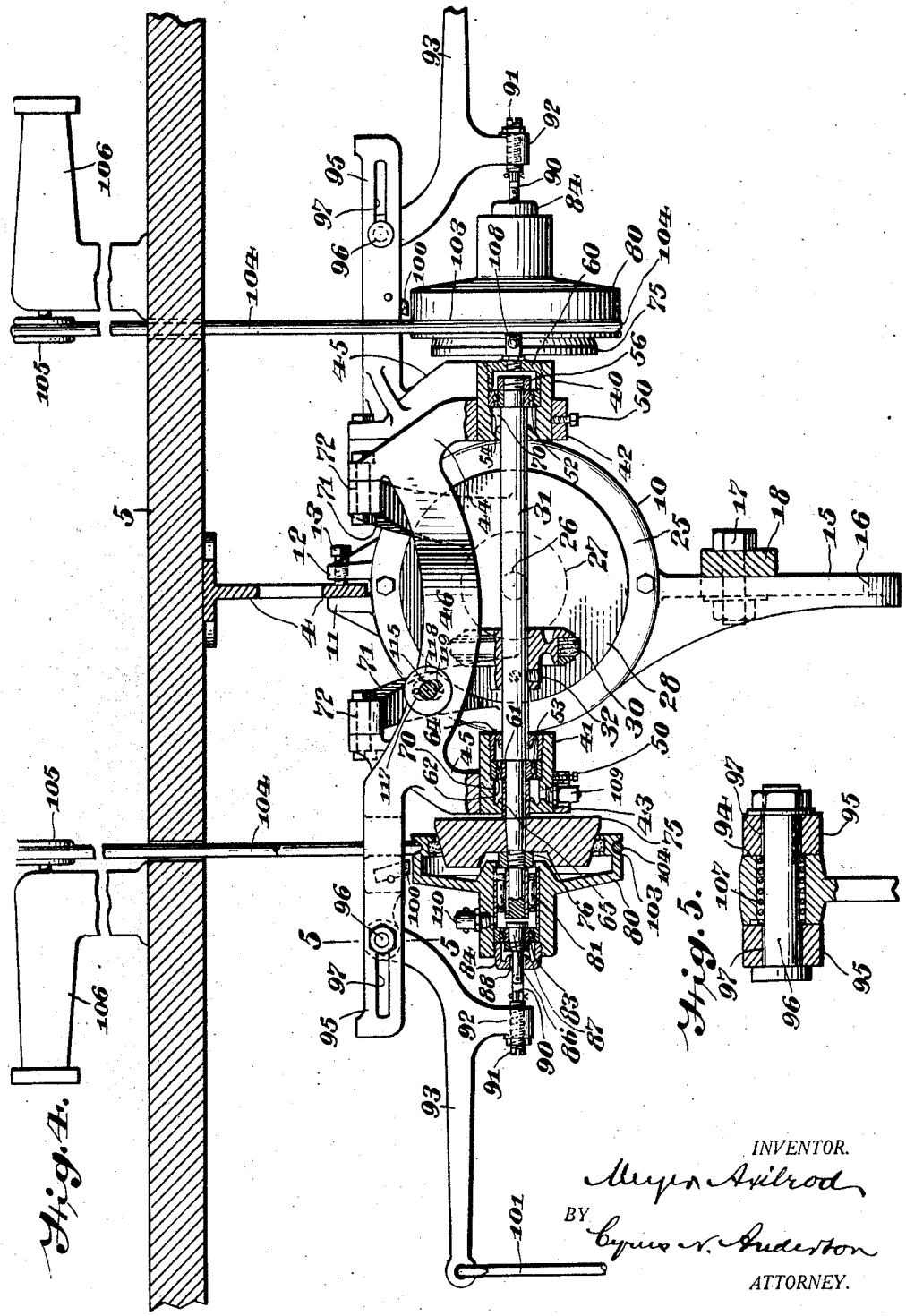

1,586,511

UNITED STATES PATENT OFFICE.

MEYER AXILROD, OF PHILADELPHIA, PENNSYLVANIA.

POWER AND TRANSMISSION MECHANISM.

Application filed July 15, 1922. Serial No. 575,367.

My invention relates to power and transmission mechanism which is particularly designed and well adapted for use in the driving or operation of sewing or other machines which are supported in pairs or couples upon opposite sides of a table or other like support, and it has for its general object to provide a new and novel construction of simplified, economical means for operating the machines of each couple by means of power and transmission mechanism which may be described broadly as constituting a single unit.

A further object is to provide a novel construction of means for operating the machines of a couple comprising a power or energy device situated intermediate the machines of a couple with means extending in opposite directions from said power or energy device and having connection with the respective machines.

A further object of the invention is to provide a novel construction of means whereby the connections between the power or energy device and the machines may be adjusted with relation to the said device and the said machines for the purpose of bringing certain parts of the connections into alinement with certain parts of the said machines.

A further object of the invention is to provide means of the character indicated which is simple in construction and compact and which may be economically constructed and installed; and a still further object is to provide a novel construction of such means of a character such that it may be applied to and employed for the operation of machines already in use.

Other objects and advantages of the invention will be pointed out in the detailed description thereof which follows or will be apparent from such description.

In order that the invention may be readily understood and its practical advantages fully appreciated, reference may be had to the accompanying drawings in which I have illustrated certain mechanical embodiments thereof. However, it will be understood that the invention is susceptible of embodiment in other forms of construction than those shown and that changes in the details of construction may be made within the scope of the claims without departing from the said invention.

In the drawings:

Fig. 1 is a top plan view of a portion of a table with a number of sewing machines shown thereon and with a portion of the part of the table which is shown broken away in order that a top plan view of the mechanism or means embodying my invention may be more clearly shown;

Fig. 2 is a vertical transverse sectional view taken on the line 2—2 of Fig. 1;

Fig. 3 is a vertical sectional view taken through a portion of the mechanism showing a detail of construction;

Fig. 4 is a vertical sectional view taken on the line 4—4 of Fig. 1 in a plane at right angles to the planes in which Fig. 2 is taken;

Fig. 5 is a transverse sectional view taken on the line 5—5 of Fig. 4; and

Fig. 6 is a plan view of a fragmentary portion of the apparatus showing a modified construction of means for transmitting the power from the power device to the machine or machines to be operated.

Referring to the drawings: 1 designates each of a pair or couple of legs to the upper ends of which is adjustably secured by means of clamping bolts 3 a top rail 4 for supporting a table designated as a whole by the reference numeral 5. It will be understood that there are a plurality of top rails arranged in spaced parallel relation with respect to each other and a plurality of couples or pairs of legs for supporting such rails.

10 designates the outer shell of an electric motor having a couple of spaced parallel wide projections 11 and 12 which extend upwardly from its top side upon opposite sides of the lower web-like portion of the top rail 4. These projections are clamped and secured to the top rail by means of binding screws or bolts 13. The outer shell or frame 10 of the motor is also provided with a relatively long depending projection 15 having a relatively long slot 16 therein through which a clamping bolt 17 extends for the purpose of securing the same to an arched cross bar 18 having adjustable connection at its opposite ends by projections extending inwardly from the inner side of the legs 1. The connection is effected by means of clamping bolts 20 which extend through holes in the outer ends of the bar 18 and slots 21 in the said projections. It may under certain conditions be found necessary or desirable that the point of connection of the bar 18 to the projection 15 which depends from the motor casing or frame shall occupy a lower position than that indicated. In such case the position of the bar 18 may be changed so that it arches downwardly instead of upwardly.

The opposite ends of the motor casing or frame 10 are closed by means of outwardly swelled flanged cover plates 25 which are secured to the said casing by screws or other means extending through said flanges and into said frame. The motor shaft 26 extends entirely through the said motor and its opposite ends project beyond the outer sides of the cylindrical projections 27 upon the covers 25. Friction drive plates 28 are secured to the opposite ends of the shaft. These plates rotate with the shaft 26 and are adapted to be engaged frictionally by the friction disks 30 adjustably mounted upon the shafts 31. There is one disk for each shaft. The hubs of these friction disks are extended upon one side and the extended portions are provided with clamping screws 32 which are adapted to be loosened and tightened, whereby the said disks may be changed from one position to another upon their supporting shafts and secured in such position by tightening the binding screws 32. The disks 30 are driven by the friction driving plates 28, therefore it will be understood that when the disks are in position upon their shafts 31 to contact with the friction driving plates at points near their center the said disks are rotated relatively slowly. If it should be desired to cause more rapid rotation of the same they are adjusted so that they may engage the friction drive plates at points further removed from the center of rotation thereof. It is apparent that either of the friction disks 30 may be adjusted independently of the other so that the speed of operation of the machine operated thereby may be varied independently of the other. If it be desired to change the direction of rotation of the shafts 31 this may be accomplished by adjusting the friction disks 30 across the faces of the plates 31 to positions upon opposite sides of the axes thereof.

The respective shafts 31 are supported in bushings 40 and 41 which are of considerable length with respect to the bearings 42 and 43 therefor which are formed in the lower ends of projections or arms 44 and 45 having connection with the pivoted yokes 46. These bushings 40 are adapted to be held in position within their bearings by means of binding screws 50. By loosening these screws the said bushings together with the shafts rotatably supported therein may be adjusted with respect to the bearings 42 and 43. Situated within the bushings are ball bearings 52 and 53 upon which the said shafts are immediately supported. Movement of the ball bearings 52 in one direction within their bushings 40 is prevented by means of shoulders 54 against which the outer rings of the said ball bearings contact. The inner rings of the ball bearings 52 contact with shoulders upon the shafts 31.

Nuts 56 upon the ends of the shafts 31 within the bushings 40 retain the ball bearings 52 upon the shafts 31. For preventing relative outward movement of the ball bearings within the bushings 40 I have provided caps 60 having screw threaded connection with the interior outer end portion of the bushings 40 and the inner edges of which contact with the outer edges of the outer rings of the ball bearings 52. The ball bearings 53 at the opposite ends of the shafts are held against any movement in one direction with respect to the shaft by means of shoulders 61 thereon and are held against movement in the opposite direction within the bushings 41 by means of internal shoulders 62 upon the latter. Movement in the opposite direction of the said ball bearings 53 with respect to the bushings 41 is prevented by means of caps 64 having screw threaded connection with the interior of the inner ends of the said bushings, and the inner edges of which caps contact with the outer rings of the ball bearings 53. The ball bearings 53 are held against outward movement upon the shafts 31 by means of sleeves 65 secured thereon. Lubricant holding chambers 70 are provided within the bushings 40 and 41, as clearly shown in Fig. 4 of the drawings.

The inner ends of the opposite sides of the yokes 46 previously referred to are pivotally connected by means of pivoted bolts 72 to the outer ends of arms 71 which are integral with and extend outwardly from the outwardly swelled cover plates 25 of the motor casing.

One member 75 of a cone clutch is secured to each of the shafts 31 adjacent or near one end thereof. Each of these members is held in place by means of a nut 76 having screw threaded adjustable engagement with the shaft and being adapted to clamp the said member 75 against a shoulder upon the said shaft upon the opposite side of the said member from the said nut. The co-acting female member 80 of each of the clutches is supported upon roller bearings 81 which surround the adjacent end portion of the shaft 31. The outer sleeve of each set of roller bearings is driven into the relatively long hub of the clutch member 80 so that it becomes rigid therewith. Ball bearings 83 are situated within the outer end portion of the hub of each of the clutch members 80 and are retained in such position by means of a cap-like member 84 having screw threaded connection with the inner outer end portion of the said hub. The opposite or inner edge of the outer ring of each of the ball bearings contacts with the outer end of the sleeves 81 previously referred to. Each of the ball bearings 83 extends around or rests upon the inner end portion of a headed pin 86, the head of which projects into the sleeve 81 and the inner ring of each of said ball bearings is held in position against the head of the said pin by means of a nut 87. The outer end of each of these pins projects outwardly and loosely through an opening 88 in the cap 84 and is connected by a universal joint connection, as indicated at 90, to the inner end of an adjustable bolt 91 having connection with the lower end of a projection 92 depending from a lever 93, the inner upper end of which projects into a vertical slot 94 in the outer end of an arm 95 to which it is connected by means of a pivot bolt 96 extending through a horizontal slot 97 through said arm. The said bolt 96 is adapted to be clamped and held in any desired position within the slot 97. Each of the levers 93 is provided with a projection extending inwardly from its pivot upon which is secured a friction block or member 100 which is adapted to engage the peripheral surface of the female member 80 of each of the clutches. Each of the levers 93 is adapted to be operated in any known manner as by means of a rod 101 having connection at its lower end with a foot operated treadle (not shown).

Each of the members 80 of the clutches is provided with a groove 103 for a driving band 104, preferably circular in cross section, which band also engages a pulley 105 upon the driving shaft of a sewing machine 106 or other machine. The purpose of adjusting the shafts 31 axially as previously described is to bring the band grooves in the clutch members 80 into alinement with the similar grooves upon the pulleys 105.

A spring 107, coiled around the bolt 96, one end of which is connected to the bearing of the lever 93 and the other to the said bolt 96, tends to cause upward pivotal movement of the said lever 93 to hold the friction or brake block 100 in engagement with the peripheral surface of the adjacent member 80 of the clutch.

Lubricant cups 108, 109 and 110 are provided for lubricating the parts with which they are connected and associated.

For the purpose of effecting adjustments of the yokes 46 to cause movement of the friction disks 30 either into engagement or out of engagement with the friction drive plates 31 I have provided manually operable rods 115 each of which has screw threaded engagement at its inner end with a screw threaded hollow projection 116 extending outwardly from the adjacent outwardly swelled cover plate 25. The said rods extend loosely through openings 117 in the said yokes and are retained in longitudinally fixed position with respect thereto by means of washers 118 upon opposite sides of the said yokes and pins 119 which extend through the said rods. Upon screwing the said rods inwardly the friction disks 30 are clamped against the friction plates 31 so that upon rotation of the latter rotation of the said friction disks 30 and the shafts 31 upon which they are supported is effected.

In order to limit the force with which the friction disks 30 may be clamped against the plates 31 I have provided upon the rotatable adjusting rods 115 sleeves 120, the inner ends of which are in contact with the outer ends of the cylindrical hollow projections 116 with which the rods 115 have screw threaded connection. The positions of these sleeves upon the rods 115 are controlled by the positions of the nuts 121 which are retained in the position to which they may be adjusted by means of lock nuts 122.

It is apparent that the adjusting rods 115 may be adjusted independently of each other and that the respective transmission means or mechanism between the friction drive plates 28 and the machine to be operated are independently controllable. It follows that one only of the machines may be thrown out of operation, that both of them may be thrown out of operation, or that both of them may be placed in operation as may be desired.

Instead of the adjustable friction disks 30 being situated upon the shafts to be driven from the motor shaft, they may be situated upon the motor shaft, as in the construction shown in Fig. 6. In this latter construction the friction disks 130 are secured to the motor shaft 26, and by loosening the screws 131, may be adjusted to different positions upon said shaft. These friction disks are in engagement with friction plates 132 secured to the inner ends of shafts 133 from which transmission means, not shown, extends to the machine to be operated for operating the same. Upon adjustment of the friction disks 130 to different positions with respect to the friction plates 132 the speed of rotation of the latter will be varied. Upon adjustment of the disks 130 so that they contact with the plates 132 eccentrically of but near their centers the speeds of rotation will be greater than when the contact is made further away from the center. This is the reverse of the action when the disks 30 are adjusted upon the shafts 31 as previously described.

It will be apparent that the construction and operation of the transmission means or mechanisms at the opposite sides of the motor are identical.

It will be seen that by my invention I have provided a simple, compact construction of means by which a couple of machines may be driven by means of friction plates upon the opposite ends of a motor shaft projecting from opposite sides of the motor, and that the transmission mechanism intermediate the said friction plates and the machine to be operated or other work to be done may be readily connected or disconnected from the said friction plates so as to place the apparatus either in or out of operation, as may be desired.

Having thus described my invention, what I claim and desire to secure by Letters Patent is:

1. In power and transmission mechanism, the combination of an electric motor having a shaft the opposite ends of which project from the opposite sides thereof, which shaft has secured thereto driving means, arms projecting from the opposite sides of the casing of said motor, shaft supporting frames swingingly supported from said arms, shafts supported in the said frames, which shafts respectively are situated adjacent the opposite ends of the motor shaft and extend substantially at right angles thereto, means carried by said shafts for engaging the said driving means upon the motor shaft, and means for independently adjusting the said frames inwardly and outwardly upon their pivots to engage and disengage the said last mentioned means with and from the said driving means.

2. In power and transmission mechanism, the combination of an electric motor having a shaft the opposite ends of which project from the opposite sides thereof, which shaft has secured thereto driving means, arms projecting from the opposite sides of the casing of said motor, shaft supporting frames swingingly supported from said arms, shafts supported in the said frames, which shafts respectively are situated adjacent the opposite ends of the motor shaft and extend substantially at right angles thereto, means carried by said shafts for engaging the said driving means upon the motor shaft, means for independently adjusting the said frames inwardly and outwardly upon their pivots to engage and disengage the said last mentioned means with and from the said driving means, and connections between the said last mentioned shafts and the machines to be operated from the said mechanism.

3. In power and transmission mechanism, the combination of an electric motor having a shaft the opposite ends of which project beyond the opposite sides thereof, friction drive means secured to the said opposite ends, upwardly and outwardly extending arms projecting from the opposite sides of the casing of the said motor, U-shaped frames having pivotal connection at their inner ends with the outer upper ends of the said arms, the said frames being provided with downwardly extending projections terminating in bearings, bushings mounted within said bearings, which bushings are axially adjustable, shafts mounted within and secured to said bushings and being adjustable therewith, means upon said shafts which are adapted to engage with the said driving means, and independent adjustable means having connection with the respective U-shaped frames for effecting independent swinging movement thereof so as to vary the positions of the said last mentioned shafts with respect to the said driving means.

4. In power and transmission mechanism, the combination of a pair of supporting legs arranged in spaced relation to each other, a top rail secured to the upper ends of said legs, a reversible arch-shaped bar having adjustable connection with said legs a distance below the said top rail, an electric motor having detachable connection with the said top rail and the said arch-shaped bar, the opposite ends of the shaft of which project beyond the opposite sides thereof, driving means secured to the said opposite ends, bracket arms projecting outwardly and upwardly from the opposite sides of the casing of said motor, yoke-shaped frames having pivotal connections with the upper outer ends of the said arms, which frames are provided with depending projecting portions which terminate in bearings, axially adjustable bushings supported in said bearings, shafts secured within and supported upon said bushings, which shafts are adjustable with the latter, means upon the said bushings which are adapted to co-operate with the said driving means, independent manually adjustable rods having connection with the said frames and with the said outwardly and upwardly projecting arms for effecting swinging inward and outward movements of the said frames, means for limiting the inward adjustment of the said adjustable rods, and connections between the said last mentioned shafts and the machines to be operated thereby.

5. In power and transmission mechanism, the combination of an electric motor the opposite ends of the shaft of which project outwardly from the opposite sides thereof, which shaft is provided with driving friction plates upon its opposite ends, arms projecting upwardly and outwardly from the opposite sides of the casing of said motor, frame members pivotally connected to the upper outer ends of said arms, which frame members are provided respectively with downwardly extending projections terminating in bearings and with outwardly extending slotted arms, axially adjustable bushings within said bearings, shafts supported within said bushings and adjustable therewith, friction disks supported upon said shafts, which disks are adapted to engage the said driving friction plates, manually operable means for independently pivotally adjusting the said frame members toward and from the said friction plates, energy devices upon the said last mentioned shafts, said devices each including an axially movable member, levers pivoted upon the said slotted arms and having connection with the said movable clutch members for axially adjusting the same, said levers being provided with braking means for engaging the said movable members of the clutch devices, and connecting means between the said movable members of the clutch devices and the machines to be operated.

In testimony that I claim the foregoing as my invention, I have hereunto signed my name this 15th day of July, A. D., 1922.

MEYER AXILROD.